Feb. 26, 1935.  R. C. BENNER ET AL  1,992,176

DRAWING MATERIAL

Filed Dec. 5, 1932

INVENTORS
RAYMOND C. BENNER
HENRY P. KIRCHNER
BY ROMIL L. MELTON

ATTORNEY

Patented Feb. 26, 1935

1,992,176

UNITED STATES PATENT OFFICE

1,992,176

DRAWING MATERIAL

Raymond C. Benner, Henry P. Kirchner, and Romie L. Melton, Niagara Falls, N. Y., assignors to The Carborundum Company, Niagara Falls, N. Y., a corporation of Pennsylvania Application December 5, 1932, Serial No. 645,761

3 Claims. (Cl. 41—32)

This invention relates to improvements in drawing materials.

It has been proposed to make pastel fabrics by attaching granular materials to a fabric by means of an adhesive. When the usual variety of abrasive paper or cloth is used for this purpose, the irregular orientation of the abrasive particles and the character of the sizing coating, which is distributed over these particles by contact with glue rolls produce an irregular surface which takes up chalk in irregularly distributed amounts. What may be called the storage capacity for the chalk or crayon varies greatly over the pastel surface.

A principal object of this invention is to provide a pastel fabric of such material as paper, cloth or the like which is coated with granules of which the major portion have their maximum dimensions approximately perpendicular to the surface of the fabric. The granular coating is also sized in a manner which strongly reinforces the attachment of the oriented granules to the fabric while leaving between the granules comparatively large spaces for the storage of pastel colors.

Figure 1:
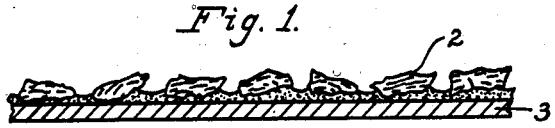
Figure 2:

The invention is illustrated by the accompanying drawing in which:

Fig. 1 is a side elevation indicating a typical arrangement of granules and adhesive in abrasive fabric; and Fig. 2 is a similar view indicating the arrangement of granules and adhesive in our improved pastel fabric.

Fig. 1 illustrates an ordinary sheet of granular coated material. It will be noted that the particles 2 are so positioned on the backing 3 that their broad flat faces form the texture of the surface. Contrasted with this is the coated surface illustrated in Fig. 2 in which the granules 4 are so positioned that their longer axes are substantially normal, or at least at an angle of from 45° to 90°, with respect to the surface of the backing material 3. The previously known type of granular coated surface is irregular in its character and does not present a surface that is particularly adapted to form a desirable chalk or pastel receiving surface. The broad flat faces, which are presented to the chalk in the operation of drawing a picture, are smooth and do not abrade the crayon, it being understood, of course, that abrasion of the crayon is necessary in order to color the surface. The only portion or portions of the flat-wise positioned granules of the previously known coated materials that do abrade the chalk are the edges of the granules.

We have found that very superior results can be obtained by using a coated surface, the granules of which are so positioned that their longest axes are at an angle of from approximately 45° to approximately 90°, both inclusive. A granular surface of this nature is of what might be called a finer texture because the outer surface has a myriad of fine points and because the granules are close together since they are positioned on the backing in an end-wise fashion rather than flat-wise.

In carrying out our invention, we bring differently colored crayons of pastel or chalk into engagement with the granular coated surface, in which the particles are arranged endwise with respect to the backing material rather than flat-wise, and by moving the crayons with respect to the granular surface, cause the differently colored materials to be deposited in finely divided form between the granules and in the form of a picture.

The more regular distribution of the granules and the finer texture of the surface gives a more uniform distribution of the coloring materials. This results in a more pleasing appearance of the completed picture. The depth of the spaces between the granules and the closeness of the oriented particles result in a surface that is better adapted to receive and hold the coloring material. The fine texture of the surface permits the deposition of small amounts of coloring material whereby delicate lines and shadings are made possible.

Various kinds of granular coated surfaces can be used in carrying out our invention; that is, the granular material may be any of the well known abrasive materials such as silicon carbide, fused alumina, flint, garnet, etc., or it may be of any other desired material. The choice of a particular material depends to a large extent upon the type of background desired in the formation of the picture. A surface of silicon carbide granules may be substantially black or different shades of green. A surface of crystalline alumina may be brown, ranging from a very light tan to a comparatively dark shade of brown. Flint coated surfaces are usually white or cream, while garnet surfaces range from a deep red to a light pink. Different results can be obtained by blending the different granular materials in different proportions, or by the use of differently colored adhesive materials. The specific mention of these different materials is not intended to limit the invention to the use of any one or any combination of materials; rather the scope of the invention is intended to be measured by the appended claims.

We claim:

1. A pastel picture comprising a backing, a coating of adhesive over the backing, a layer of upstanding elongated granular particles applied over the adhesive surface and a plurality of layers of color-bearing particles of preselected color applied between the said upstanding granular particles, the said layers of color-bearing particles being arranged with respect to each other to produce a picture wherein substantially all the reflected light is reflected by color-bearing particles.

2. A pastel picture comprising a backing, a coating of adhesive over the backing, a layer of upstanding elongated granular particles applied over the abrasive surface and forming a deeply serrated surface having between the individual particles interstices which are greater in depth than the minor dimensions of the particles, and adapted to hold a plurality of super-imposed layers of color-bearing material between the said particles and in the said interstices, and a plurality of layers of color-bearing particles of preselected color applied between the said upstanding granular particles, the said layers of color-bearing particles being arranged with respect to each other to produce a picture wherein substantially all the reflected light is reflected by color-bearing particles.

3. A pastel picture comprising a backing, a coating of adhesive over the backing, a layer of upstanding elongated granular particles applied over the abrasive surface and a layer of color-bearing particles applied between the upstanding granular particles, the said layer of color-bearing particles being arranged with respect to each other to produce a picture wherein substantially all the reflected light is reflected by said color-bearing particles.

RAYMOND C. BENNER.
HENRY P. KIRCHNER.
ROMIE L. MELTON.